Nov. 28, 1950 — C. D. ORSINI — 2,531,739
PROCESS FOR PREPARING THERMOPLASTIC MATERIAL
Filed Feb. 8, 1946 — 3 Sheets-Sheet 1

INVENTOR.
CAMILLO D. ORSINI
BY Des Jardins & Crumpton
HIS ATTORNEYS

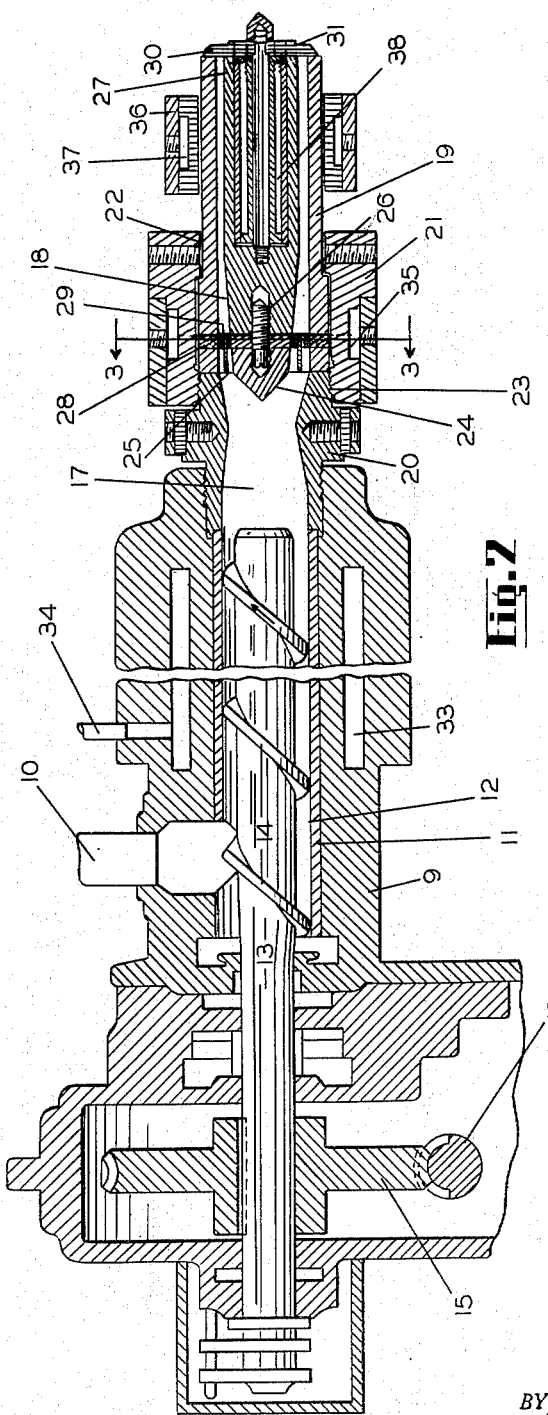

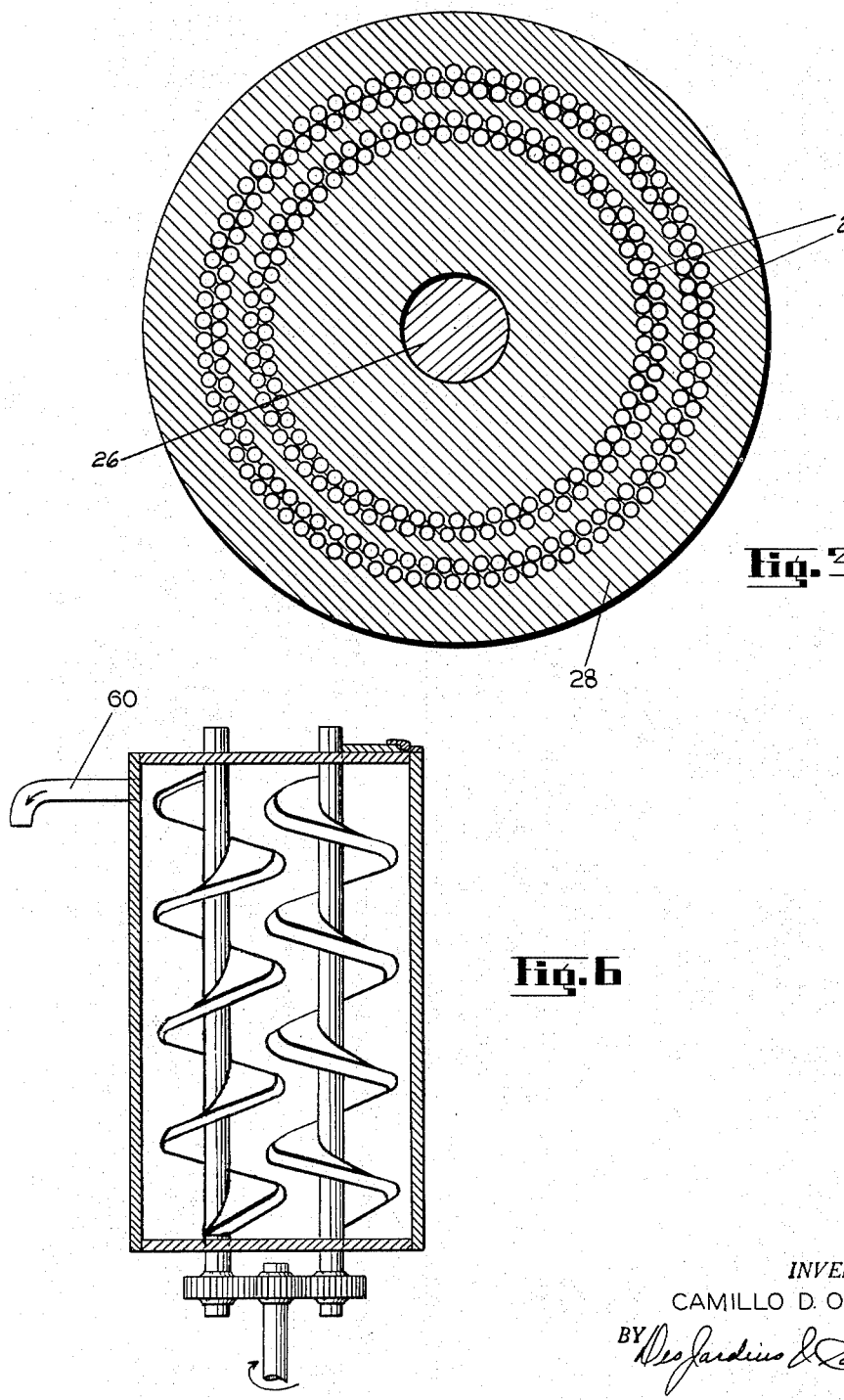

Patented Nov. 28, 1950

2,531,739

UNITED STATES PATENT OFFICE 2,531,739

PROCESS FOR PREPARING THERMOPLASTIC MATERIAL

Camillo D. Orsini, Highland Park, N. J., assignor to Nixon Nitration Works, Nixon, N. J., a corporation of New Jersey Application February 8, 1946, Serial No. 646,469

2 Claims. (Cl. 18—51)

My invention relates to an improved process for forming plasticized thermoplastic molding stock material and has to do more with the formation of conditioned conveniently sized chunks or blocks, which are to be formed later into rods, tubes, bars or sheets by molding.

The principal object of my invention is to provide a process for forming molding stock of plasticized thermoplastic chunks or blocks of uniform physical characteristics, especially as to homogeneity of the solvent and plasticizer.

A further object of my invention is to provide a process which eliminates certain steps of the previously known best methods of producing such plasticized thermoplastic molding stocks.

A further object of my invention is to provide a process for forming plasticized thermoplastic molding material which will result in increased production of manufacturing facilities by reduction of processing time.

Further objects, and objects relating to details and economies of operation, will definitely appear from the detailed description to follow. In one instance, I have accomplished the object of my invention by the devices and means set forth in the following specification. My invention is clearly defined and pointed out in the appended claims. Apparatus, useful in carrying out the improved process of my invention, is illustrated in the accompanying drawings, forming a part of this specification, in which:

Fig. 2 is a vertical longitudinal, sectional view through a continuous hot extrusion machine containing a filter screen.

Fig. 3 is an enlarged, detail, sectional view taken along the line 3—3 of Fig. 2 showing the filtering screen disc.

Fig. 6 is a view partly in section of a mixing mill for introducing the plasticizer, solvent, and pigment if desired, into the raw thermoplastic.

In the drawings the same reference numerals refer to the same parts throughout the several views, and the sectional views are taken looking in the direction of the arrows at the ends of the section lines.

Figure 1:
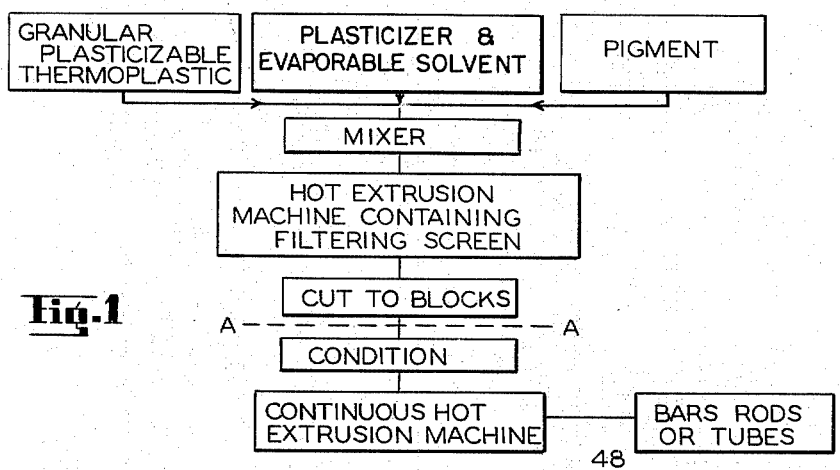
Fig. 1 is a flow diagram showing the steps in my new and improved process, and showing how such steps are related to subsequent manufacturing steps.

It has been the practice in the preparation of raw thermoplastic material for subsequent extrusion to a final product, to mix the granular or flake plasticizable thermoplastic with the plasticizer, evaporable solvent and pigment, in a mixer having sets of oppositely revolving blades. After such ingredients are thoroughly mixed and the material is relatively soft and doughy, it has been the practice to feed it into the chamber of an hydraulic ram and force it through a filtering screen to remove lumps, dirt and foreign matter and to thoroughly homogenize the mass. The filtered plasticized material would then be remixed in a mixer similar to the one described above, under reduced pressure, during which operation a portion of the solvent is evaporated. The filtered material with a portion of the solvent evaporated, but which still has enough solvent remaining to be soft and workable, would then be worked on a rolling mill until all of the ingredients are thoroughly blended and incorporated so as to produce a homogenous material. This rolling operation is frequently carried out under variable atmospheric and environmental conditions such that because of considerable elapsed time and uneven exposure to the atmosphere, there are considerable variations in the percentage of solvent remaining in different parts and batches of the blended material, such causing the finished stock material to vary considerably in consistency. The milled material leaving the rolling mill in the form of a sheet about one inch thick would then be cut into strips, which are fed into a chopper to be cut into chunks or blocks for storage and later use in manufacturing a final product.

After the conditioning process, which takes about eight days in closed containers, the material is preheated for the final extrusion.

My improvement upon this old process consists in the elimination of certain operations and combining others, so that the variation in the percentage of solvent between different points in the material, before final storage, will be between the narrow limits of seven and a half percent (7½%) to nine (9%) percent, instead of between four (4%) percent to twelve (12%) percent, as in the said old process, just described.

The first step in my improved process consists in mixing the granular plasticizable thermoplastic, such as cellulose nitrate or cellulose acetate, with a suitable plasticizer and an evaporable solvent, and a pigment if it is desired, in a mixing machine, under a reduced pressure until the ingredients are thoroughly mixed and incorporated and the percentage of solvent is reduced the desired amount. This differs from the best previously known process, which has been described, in that I use a reduced pressure in this first step.

The next step of my improved process consists in feeding the finished mixed material from the mixing machine directly to a special continuous screw stuffer type of hot extrusion machine containing a filter, which extrudes the material in the form of strips or bars. The extrusion machine is provided with the filter, so that in the second step of my process the material is further mixed and homogenized, filtered and extruded in bars or strips, in a single operation with little atmospheric contact.

In the third and last step of my improved process the bars or strips, which were extruded from the extrusion machine are cut into blocks or chunks of the desired size, after which the storage commences.

To describe the process in greater detail, in the first step of my improved process, I mix the granular plasticizable thermoplastic, with a suitable plasticizer, evaporable solvent and pigment in a mixing machine, shown in Fig. 6, under a reduced pressure indicated by suction pipe 60. The mixing machine, for example, may have oppositely rotating spiral rollers spaced parallel axially a slight distance apart. After the ingredients are thoroughly mixed and incorporated and the percentage of solvent is reduced to that which is desired, as determined by test, as the second step, I feed the material directly from the mixing machine into the continuous hot extrusion machine, as has been said, where it is worked, forced through a filter disc and then extruded in bars.

Figure 4:
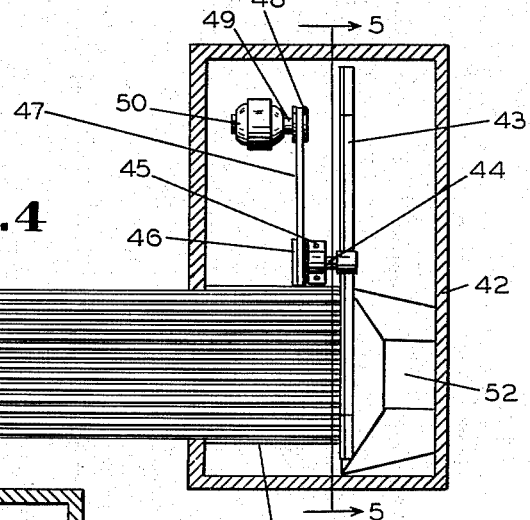
Fig. 4 is a view partly in section of a conveyor feeding the extruded stock through a chopper.

The extrusion machine shown in Fig. 2 includes a body 9 having a longitudinally extending bore 11 within which there fits a lining sleeve 12. The mixed plasticizer material is discharged from the mixer into the hopper throat opening 10, which opening communicates with the interior of the lining sleeve 12. A screw shaft 13 is journalled in suitable bearings and provided with a continuous spiral flight 14 forming a feed screw, which turns within the liner sleeve 12 and has bearing thereon so that the mixed material is worked toward the extruding nozzle. A worm gear 15 is splined to the screw shaft 13 and meshes with a worm 16 driven from a suitable source of power to turn the screw in the direction of the arrow. The material entering the throat opening 10 is moved to the right end of the machine, as shown in Fig. 2, within the lining sleeve 12, by means of the turning feed screw 13, and there is forced into a throated chamber 17, which leads to the filtering screen disc 28 (see also Fig. 3). This chamber 17 is formed in a block 20 secured in place just forward of the end of the screw. The nozzle block 19 is secured to the block 20 by a nut 21 having a locking shoulder 22, and internal threads 23 adapted to engage threads in the block 20. A plate 24 surmounted by a guide cone is seated between the block 20 and nozzle block 19, said plate being provided with an annular series of passages 25. Between the plate 24 and nozzle block 19 a filtering disc 28 (see also Fig. 3) provided with a plurality of perforations 29, is seated. A set screw 26 is provided for adjusting said plate relative to a core 27 provided in the nozzle block 19 to accommodate different disc thicknesses. The core 27 located centrally in the nozzle block 19 forms an annular passage 18. Secured to the forward end of the core 27 of the extrusion nozzle block 19 is a disc 30 provided with a number of openings 31 regularly spaced around the delivery end of annular passage 18, through which the material is continuously extruded in the form of strips 39 (see Fig. 4). At various portions of the extrusion machine, channels 33, 35, 37 and 38 are provided in which heating fluid is circulated to keep the thermoplastic mass at the proper molding temperatures.

As the material is fed into the throat opening 10 and carried toward the nozzle by the screw 13, it is subjected to heat and pressure by means of which it is advanced into the chamber 17 and forced through the filter disc 28 which clears the mass of all foreign and oversized particles. Moreover, the mixture delivered to the throat opening 10, is thoroughly plasticized and homogenized under the heat, churning, and pressure to which it is there subjected.

Figure 5:
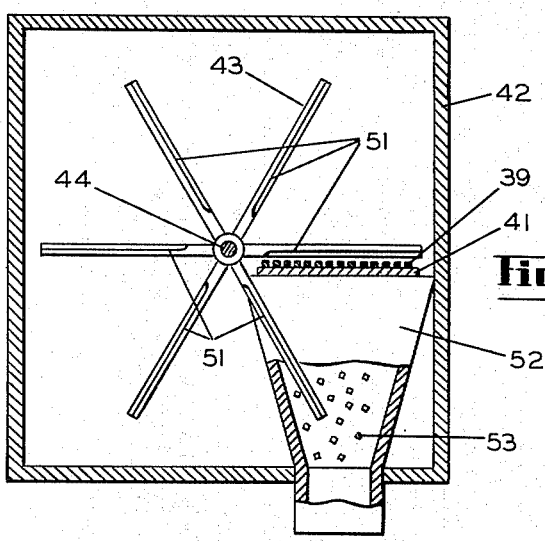
Fig. 5 is a vertical sectional view taken along the line 5—5 of Fig. 4.

The extruded bars 39 (Fig. 4) are carried by a conveyor 40, on to a table 41 (Figs. 4 and 5) leading to the blades of a chopper 42. The chopper 42 is provided with a hub having radial cutter arms 43 which hub is fast on an axle 44, said axle being journalled in a bearing bracket 45. A pulley 46 fast on axle 44 is coupled by belt 47 to a pulley 48 fast on the power shaft 49 of an electric motor 50. Each cutter arm 43 has a knife blade 51 secured thereto, which operates to chop the strips or bars 39 into chunks or blocks 53 as they are fed past the end of the table. The chunks or blocks fall into a throat 52 and are collected in closed cans for seasoning and conditioning. The steps set forth in the flow diagram of Fig. 1 which follow the line A—A are subsequent to the steps of my process and are shown for the purpose of correlating this process to the one disclosed in said copending application.

I am aware that the particular process herein described is susceptible of considerable variation without departing from the spirit of my invention and, therefore, I claim my invention broadly as indicated by the appended claims.

Having thus described my invention what I claim as new and useful and desire to secure by Letters Patent is:

1. The process of forming thermoplastic plasticized strips comprising the steps of mixing the unplasticized thermoplastic material with a suitable plasticizer and evaporable solvent under reduced pressure in a mixer provided with agitating blades until the thermoplastic and other materials are in a workable mass suitable for being extruded, feeding the mixed mass directly from the mixer to a heated screw stuffer type extrusion machine containing a filter, extruding and filtering the mixed mass in a heated condition for homogenizing said mixed mass and forming it into a strip, and subdividing the extruded strip into suitable lengths.

2. The process of forming thermoplastic plasticized raw molding stock comprising the step of mixing the unplasticized thermoplastic with a suitable plasticizer and evaporable solvent under reduced pressure in a mixer provided with agitating blades until they are in a workable mass suitable for being extruded and the solvent is within about a range from about 7½ to 9%, feeding the mixed mass directly from the mixer to a heated screw stuffer type extrusion machine containing a filter, extruding and filtering the mixed mass in a heated condition for homogenizing said mixed mass and forming it into a strip, and subdividing the extruded strip into suitable lengths.

CAMILLO D. ORSINI.

REFERENCES CITED

The following references are of record in the file of this patent:

UNITED STATES PATENTS

| Number | Name | Date |
| --- | --- | --- |
| 1,781,648 | Mapother | Nov. 11, 1930 |
| 2,022,895 | Morrell | Dec. 3, 1935 |
| 2,039,162 | Gerstenberg | Apr. 28, 1936 |
| 2,103,546 | Morrell | Dec. 28, 1937 |
| 2,146,532 | Crane | Feb. 7, 1939 |
| 2,319,859 | Hale | May 25, 1943 |